United States Patent
Donazzi et al.

[11] Patent Number: 6,167,525
[45] Date of Patent: Dec. 26, 2000

[54] METHOD AND SYSTEM FOR ANALYSIS OF ELECTRIC POWER TRANSMISSION LINK STATUS

[75] Inventors: Fabrizio Donazzi; Roberto Gaspari, both of Milan, Italy

[73] Assignee: Pirelli Cavi e Sistemi S.p.A., Milan, Italy

[21] Appl. No.: 09/030,509

[22] Filed: Feb. 25, 1998

Related U.S. Application Data

[60] Provisional application No. 60/050,169, Jun. 19, 1997.

[30] Foreign Application Priority Data

Feb. 26, 1997 [EP] European Pat. Off. .............. 97103126

[51] Int. Cl.[7] ................................. G06F 1/26; G06F 1/30
[52] U.S. Cl. ......................... 713/330; 713/300; 324/106; 385/100; 340/870.17; 307/31; 361/93
[58] Field of Search .................................... 713/300, 330, 713/340; 340/825.06, 870.17, 538, 870.16; 307/31–39, 115; 324/126, 127, 105, 106; 361/124, 93; 374/163; 702/108; 385/100, 115

[56] References Cited

U.S. PATENT DOCUMENTS

| | | | |
|---|---|---|---|
| 4,635,055 | 1/1987 | Fernandes et al. ................ | 340/870.17 |
| 4,728,887 | 3/1988 | Davis ..................................... | 324/127 |
| 4,847,780 | 7/1989 | Gilker et al. .............................. | 702/64 |
| 4,886,980 | 12/1989 | Fernandes et al. ....................... | 307/64 |
| 5,140,257 | 8/1992 | Davis . | |
| 5,181,026 | 1/1993 | Granville ............................ | 340/870.28 |
| 5,963,457 | 10/1999 | Kanoi et al. ....................... | 364/528.26 |

FOREIGN PATENT DOCUMENTS 0 466 155   1/1992   European Pat. Off. .

OTHER PUBLICATIONS

S. T. Larsen et al., "Cable Rating Methods Applied to a Real–Time Cable System Monitor", IEE Conference On Power Cables, XP 000676256, pp.203–207, Nov. 23, 1993.

*Primary Examiner*—Gopal C. Ray
*Attorney, Agent, or Firm*—Finnegan, Henderson, Farabow, Garrett & Dunner, L.L.P.

[57] ABSTRACT

A method and system for transporting electric power in a link and for the analysis of the status of an electric power transmission link and the relevant current rating capability control. The method includes dividing the link into a predetermined number of segments, each segment having an associated prediction model and at least two associated temperature sensors. Upon receiving sensor values, an expected operating condition in one of the segments is determined based on the sensor value and the electric current value. Next, an actual operating condition in the segment is determined and compared with the expected operating condition. If there is a difference between the conditions, a second predetermined prediction model is associated with the segment.

27 Claims, 4 Drawing Sheets

METHOD AND SYSTEM FOR ANALYSIS OF ELECTRIC POWER TRANSMISSION LINK STATUS

This application claims the benefit of U.S. Provisional No. 60/050,169 filed Jun. 19, 1997.

BACKGROUND OF THE INVENTION

The present invention relates to a method and a system for transporting electric power in a link, in particular to a method and a system for the analysis of the status of an electric power transmission link and the relevant current rating capability control.

For the purposes of the present invention, electric power transmission link means a system which includes means carrying electric current from a source, such as a generator, to a user, such as a city, a factory, or another kind of entity requiring supply of electric power; these means carrying electric current include electric cables, electric conductors, such as aerial conductors, accessories thereof, such as joints, terminations, junctions etc., arranged to provide the required power transport capability.

Generally, the link includes components operating at high or extra high voltage (generally from 10 to 500 kV).

The conductor and insulation operating temperature of cables, accessories and similar components of the link is a critical factor limiting the load carrying capability of a link.

An excessively high operating temperature may either cause a sudden failure, or a premature ageing, of the cable or accessory, particularly due to the deterioration of the insulation material used therein, generally of polymeric nature.

Cables and accessories working temperature is mainly determined by the heat generated in the cable or accessory by the transported electric current and by the heat dissipation capability of the surrounding environment.

The environmental conditions of the cable and accessories may be subject to change in time. The change may be due both to human activities around the cable and to seasonal conditions.

Cables and accessories, and the link load carrying capability associated thereto, are generally designed using pessimistic assumptions concerning the operating environment. In particular, the load carrying capability of a link is based on the most adverse conditions that can reasonably be expected over the life of the cables and accessories used in the link.

For that reason they are normally working well below safe temperature limits and consequently current rates in the link are generally more limited than that really feasible.

Moreover, in view of the increasing energy requirements it is often desirable to increase the cable link usage, reducing the safety margins that are currently applied in order not to overload or overheat the components of the link.

The European Patent Application EP 0 466 155 relates to a system for detecting a trouble occurrence location of an electric power cable line by using a distribution type temperature sensor and particularly a Raman backscattering optical fibre distribution type temperature sensor.

In the article of S. T. Larsen, C. L. Ong-Hal, P. L. Stephenson with the title "Cable ratings methods applied to real time cable system monitor", I.E.E. Conference on Power Cables, Nov. 23–25, 1993, a cable system monitor (CSM) is described. The CSM provides on line continuous and overload thermal ratings of cables based on system measurements and real time thermal modeling, and enables the control engineers to assess the present security of the system and to plan the operation of the system for the next day or possibly the following week.

The system provides rating assessment representing up to five potentially limiting sections of cable. The technique of using distributed temperature sensor instruments which use optical fibre sensors is said to be applicable on new cable installations once proven through operational trials; in this way, accurate initial conditions can be established for the calculation.

The Applicant has observed that the system described in this document operates on the basis of predetermined data and cannot detect and react to environmental changes, such as an unexpected change in the thermal transport properties of the environment around the cable or the like.

The U.S. Pat. No. 4,728,887 discloses a system for determining the current carrying capability of one or more overhead power transmission lines monitors one or more spans of each line on real-time basis and identifies the span having the lowest current carrying capacity which in turn establishes the maximum capacity of the entire line. The thermal state of each monitored line span is determined by measuring the conductor temperature, line current, solar radiation, ambient temperature, and in some cases wind speed and wind direction. These parameters are monitored by a sensor-transmitter unit that may be removably clamped on the line conductor which may range in size from one to several inches in diameter, and includes a radio transmitter for transmitting sensed data to a receiving substation. The data from the sensor-transmitter is multiplexed and transmitted by a telecommunications link to a computer which automatically determines line capacity using the real-time data and also calculates the time required for the "critical span" having the lowest current capacity to reach its maximum safe temperature based on any of a number of step changes in load demands.

According to the present invention the applicant discovered the problem of facing unexpected anomalous conditions in the transmission link during the operation of the link itself; and, in addition, of timely redefining the thermal evaluation model to these unexpected conditions of the transmission link, in order to determine its instant load carrying capability.

According to the present invention it was found that by getting information both on the instant operation parameters of the link, associated to the current carried therein, and on the past values of these parameters, it is possible to determine the actual and the expected operating condition of the link with high precision and to cause a regulating action, if required, in correspondence to a safety value considerably closer to the maximum acceptable value for the critical components of the link.

In addition, it was found that an effective control of the electric current carried in the link, such that the maximum load carrying capability is used when required, can be made by dividing the link during operation in a non predetermined number of segments and subsegments, in response to possible unexpected environmental changes affecting the operation of the link, if they are timely detected. It was perceived that it can be made by using a number of sensors, particularly temperature sensors, if these sensors are in number larger than the number of subsegments, so that at least one sensor can always be associated with a subsegment. It was further perceived that, to the purpose of the present invention, the temperature sensed by said sensors is to be correlated to the actual current value in the link.

In parallel, it has been perceived that a temperature sensor in the form of an elongated element, such as an optical fiber, laid along a cable in a predetermined radial position with respect to its conductor, can be used as a plurality of sensors, whose number equals to the cable length divided by the instrument longitudinal resolution. For example, if this resolution is of the order of one meter, the number of sensors associated to a cable of one kilometers length is of the order of one thousand (i.e. one sensor per each meter of cable). The ability to segment the link or the cable to the purpose of the present invention is correspondingly determined.

SUMMARY OF THE INVENTION

According to one aspect, the present invention relates to a method for transporting electric power in a current conducting link comprising:

supplying an electric current of predetermined value in the link;

dividing said link into a predetermined number of segments;

associating a first predetermined prediction model to each of said segments;

laying a plurality of temperature sensors along the link, at least two of said sensors being operatively associated with each of said segments and being affected by said current value;

getting respective sensor values from said sensors at a first time;

determining an expected operating condition in one of said segments at a second time as a function of said sensor values at said first time and of said electric current value, according to said first prediction model associated with said segment;

determining an actual operating condition in said segment at said second time associated to sensor values generated at said second time;

comparing said actual operating condition with said expected operating condition;

associating, or having associated, a second predetermined prediction model with said segment or a subsegment thereof in presence of a difference between said actual operating condition and said expected operating condition exceeding a predetermined value.

Preferably, said phase of associating, or having associated, a second predetermined prediction model comprises the phase of dividing, or having divided, said segment into at least two subsegments, each subsegment being associated with at least one sensor, in presence of a difference between said actual operating condition and said expected operating condition exceeding a predetermined value.

In particular, said method further comprises the phase of regulating said electric current value so as to maintain an expected operating condition of the segment at a selected time within a predetermined value.

Preferably, said phase of determining an expected operating condition includes:

recording a number of sensor values measured at respective times earlier than a given time;

evaluating the expected operating condition of the segment at said second time according to said first model as a function of said sensor values at said first time, of said electric current value and of said recorded sensor values.

Preferably, said link includes an insulated electric cable of predetermined length, said insulated electric cable including at least one segment.

Preferably, said operating condition of the segment associated to said sensor values includes the temperature in a predetermined location in the segment.

In particular, said operating condition of the segment associated to said sensor values includes the temperature in a point inside the cable insulation in a selected longitudinal location along the cable.

Preferably, said sensor values include a longitudinal thermal profile along the segment, measured with a predetermined longitudinal resolution.

Preferably, said sensor values include a longitudinal profile of the temperature along the segment, measured at a predetermined radial distance from the cable conductor. In particular, said longitudinal profile of the temperature along the segment is measured at cable surface.

In a preferred embodiment, said profile of the temperature includes an OTDR trace obtained through an optical fibre operatively associated with said segment.

Preferably, each of said segments has an expected substantially uniform thermal behaviour.

According to a preferred aspect of the method of the invention, said subsegment associated to said second prediction model is longitudinally extended for a length including at least the portion of said profile where the expected temperature determined from said first sensor values and said first prediction model is different from the actual temperature determined from said second sensor values and said first prediction model.

Preferably, said phase of determining the actual operating condition is repeated at a predetermined time frequency.

Preferably, said phase of determining the operation condition of the segment includes determining the temperature in a predetermined number of locations in the segment and choosing the highest of said determined temperatures as the operation condition of the segment.

Preferably, said phase of determining the actual operating condition of the segment associated to said sensor values includes:

getting a number of sensor values at a time;

determining a number of status parameters associated to said sensor values;

selecting a critical value among said status parameters;

evaluating the operating condition of the segment as a function of said critical value.

In a preferred embodiment, the method further comprises operating a thermal control means associated with said segment to maintain the operating condition in said segment within a predetermined value.

In a preferred embodiment, regulating the electric current value includes re-routing the current within the link to reduce the current rate in a segment in the link.

Preferably, determining the operating condition of the segment associated to said sensor values comprises the phase of locating the place along said segment where sensor values are measured.

Preferably, the method further includes getting further sensor values relating to the thermal exchange capability of the segment.

In a second aspect, the present invention refers to a system for transporting electric power comprising:

a link including at least an electrical cable;

a generator supplying electrical power into said link;

a plurality of sensors operatively associated with said link, said sensors comprising a longitudinally distributed temperature sensor including an optical fibre;

a data acquisition unit connected to said sensors;

a data processing unit operatively associated with said data acquisition unit;

a control actuator operatively associated with said data processing unit, said control actuator being such as to generate a control signal responsive to data generated by said sensors as processed by said data processing unit.

Preferably, that said optical fibre is located in proximity to said electrical cable.

More preferably, said optical fibre is located inside said electrical cable.

In a preferred embodiment, said distributed temperature sensor includes an OTDR apparatus connected to said optical fibre.

Preferably, said a control signal is a regulation signal acting on said generator.

Preferably, said control signal is a regulation signal acting on thermal control means to associated to a portion of said link.

More details will become apparent from the following description, with reference to the accompanying drawings.

DETAILED DESCRIPTION OF THE DRAWINGS

Figure 1:
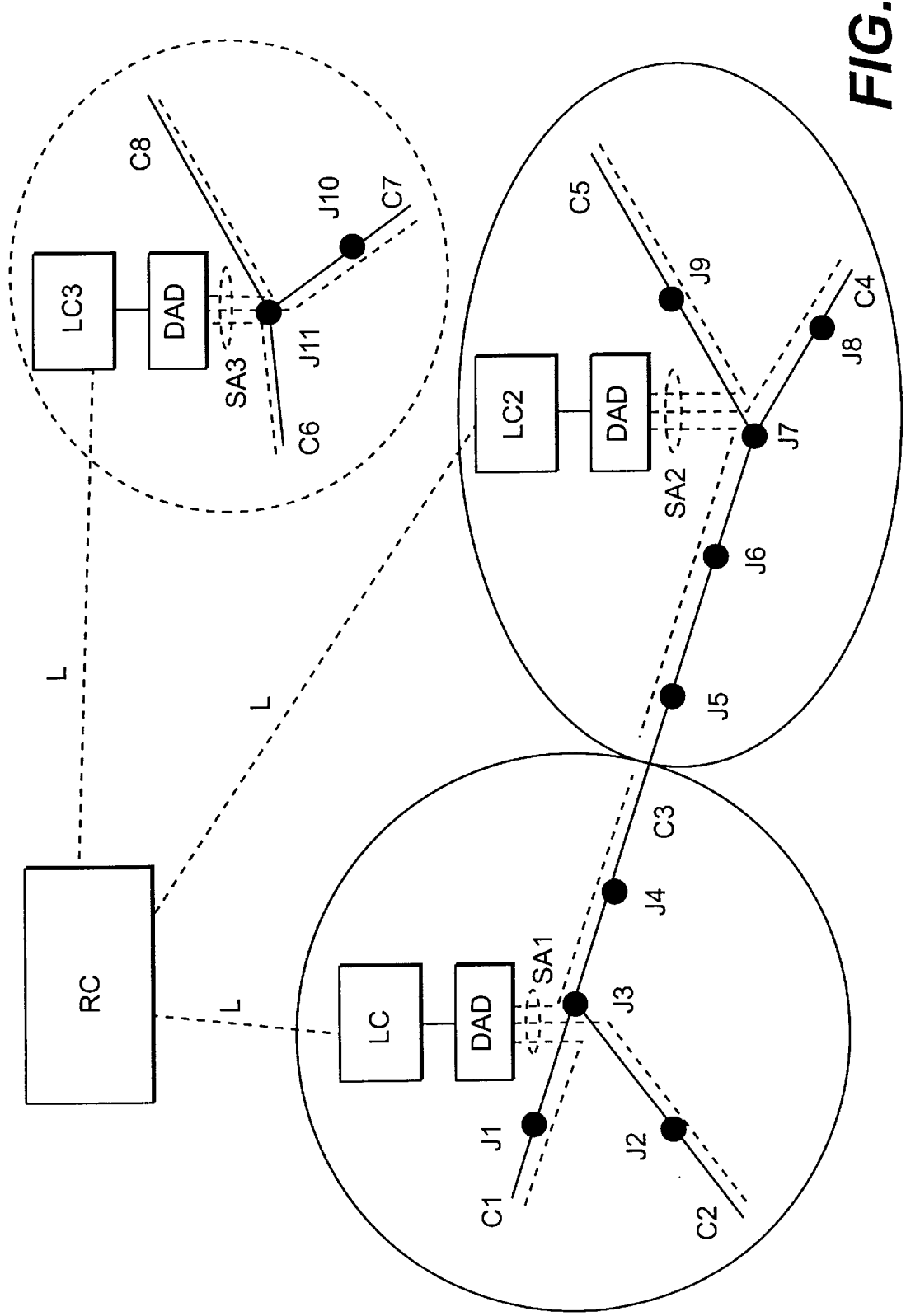
FIG. 1 is a diagram of a system according to the present invention.

In FIG. 1, a schematic view is shown of a system for the management of current rating capability in power transmission links according to the present invention. A power transmission link can be considered a part of an energy transmission network and can be composed of cables and of cable accessories as joints, termination, bifurcation, etc. In FIG. 1, for the sake of argument, only a few cables C1 to C8 connected together with joints J1 to J11, are shown.

The system includes a remote control unit RU connected, by data transmission links L1 to L3, to local control units LC1 to LC3 (three in the system shown as an example), which control respective different parts of the power transmission links. If the local control units LC1 to LC3 are properly placed near a power link node several lines can be monitored together. In general, several tens of km can be monitored by each of the local control units LC1 to LC3.

Each local control unit LC1 to LC3 is connected to a respective data acquisition and driver units DAD1 to DAD3. Such data acquisition and driver units DAD1 to DAD3 are connected to a plurality of respective sensors and actuators generally indicated with SA1 to SA3. The sensors and actuators SA1 to SA3 may be located in different positions: that is inside, on the surface or in the proximity of the cables C1 to C8 and of the joints J1 to J11.

The data acquisition and driver units DAD1 to DAD3 receive and supply signals from/to the sensors and actuators SA1 to SA3, in order to keep the cables C1 to C8 and the joints J1 to J11 under control.

Figure 2:
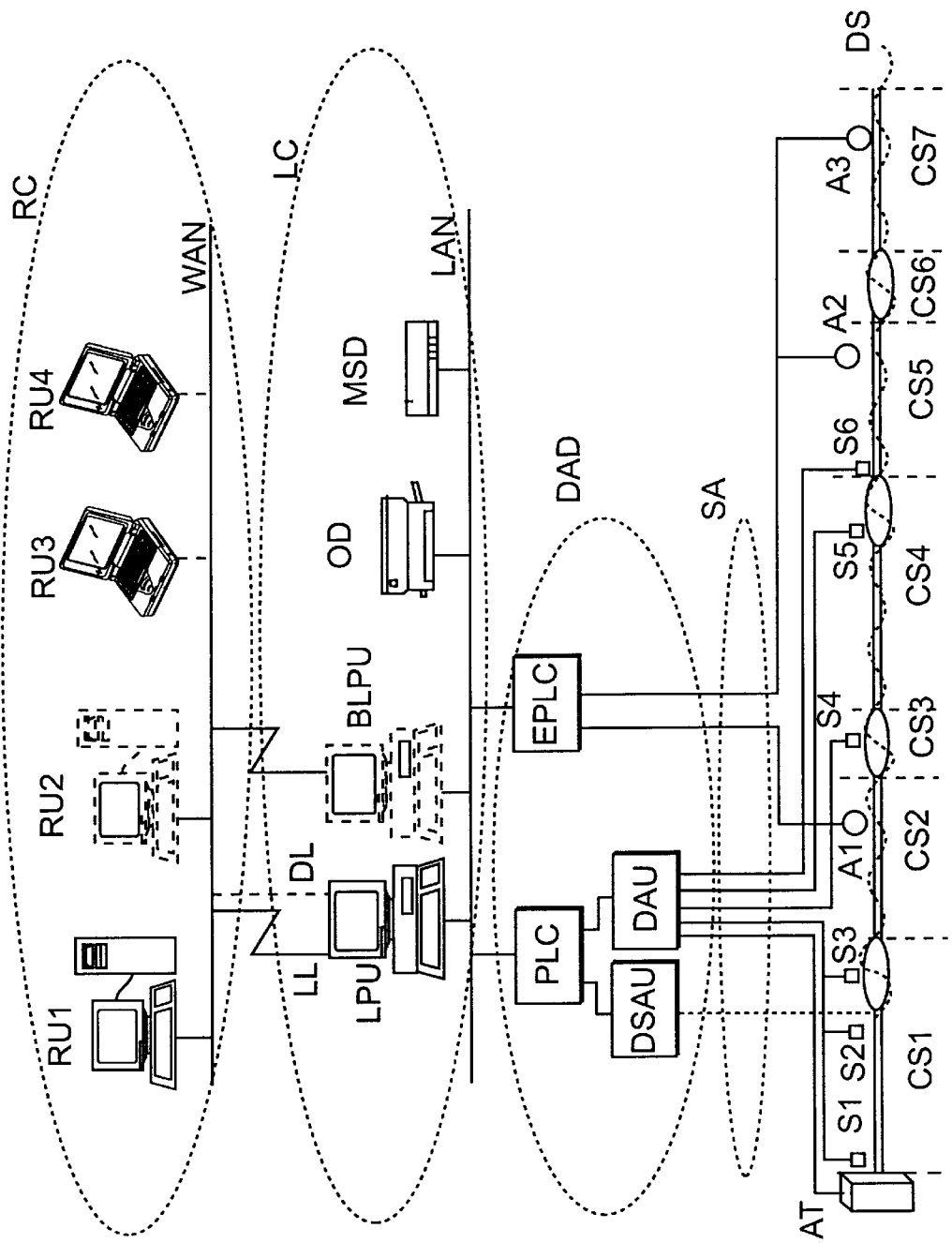
FIG. 2 is a diagram of a particular of the system according to the present invention.

In FIG. 2 it is shown a particular of the system for the management of current rating capability in power transmission links, according to the present invention. In FIG. 2 it is possible to see the main blocks already shown in FIG. 1.

For the sake of argument in the present description the term cable indicates both the cables themselves and the cable accessories as joints, termination, bifurcation, etc. to be used into the power transmission links.

FIG. 2 contemplates, for the sake of argument, a single link.

The link can include many lengths or segments of the cable from CS1 to CS7, each may be composed of different kind of cables and/or laid in many different configurations, for example in air, directly buried, in underground ducts and pipes, in underground backfill and so on.

The link is, therefore, schematised by considering it as a composition of sequential lengths or segments from CS1 to CS7, each being chosen to be described with a suitable common thermal behaviour. Joints J1 to J11 and any other part of the cable C1 to C8 that show a distinct thermal behaviour, are defined, themselves, as lengths or segments of the link.

Local sensors S1 to S6 include current, voltage, temperature and other operating parameter sensor. The kind and the number of the sensors depends on the particular local installation.

They are installed in well known locations such as inside the link elements, on their surface or in the proximity of the power links, joints, critical lengths, etc. in order to monitor all relevant operating parameters of the link for which a specific value of the relevant process parameter is required.

In particular, since the evaluations are mainly related to the thermal status and behaviour of the power transmission links, relevance is given to the temperatures acquisitions; however, by way of an example, the moisture of soil, the air velocity in open air installation and/or tunnels, the cooler flow rate and pump velocities, in forced cooling installations, mechanical displacement or strain can be measured.

All relevant local sensors S1 to S6 data, generally of analogue type, are supplied to a digital input data acquisition unit DAU, where they are conveniently converted into digital form.

The digitised data, corresponding to each of the local sensors S1 to S6, are transferred to a local programmable logic controller unit PLC.

The digital in data acquisition unit DAU and the local programmable logic controller unit PLC are included in the data acquisition and driver unit DAD.

A distributed sensor DS is used to collect distributed information on some characteristics of the link. In particular a distributed temperature sensor DS, using an optical fibre as sensor is conveniently used.

Such an optical fibre is preferably located in a position such as to be able to properly monitor the temperature variations induced by the power transmission link operations.

It may be linearly laid along the link, both inside or outside the cable as in retrofits, it may be spirally wound inside or on the cable surface, or in its proximity or may be placed in any other advantageous way.

Preferably, the optical fibre is enclosed in the cable structure, in close proximity to the cable insulation, under the cable outer sheath; conveniently, the fibre is enclosed in a protective structure, such as a metal tube.

Alternatively, the optical fibre, conveniently placed in a protective enclosure, is spirally wound around the cable or independently laid in the same trench or the like. Example of cables including an optical fibre are described in the European patent EP 0 203 249.

The temperature sensing principle used is the well known optical time domain reflectometry OTDR measuring the Raman backscattering.

When a laser pulse is injected into a fibre the incident light is, in a small part, backscattered. The scattered light spectrum is dominated by Raleigh scattering, but it also contains small contributions of Raman scattering, of which the anti-Stokes component is correlated to the local temperature. Since the Raman scattering is due to the thermal vibration of the molecular structure of the optical fibre, its intensity depends largely upon the optical fibre temperature. The Raman scattering can be detected because it has different wavelength from the incident light.

The temperature measure is performed through the measure of the amplitude of the back scattered anti-Stokes peaks. Said amplitude depends on the temperature of the molecular structure that has generated the backscattered signal, and, since all points of the optical fibre generate a backscattered signal when reached by the laser pulse, it is a function of time, giving a temperature profile of the fibre.

The return time of the backscattered signal gives an indication about the distance between the molecular structure of the optical fibre that has generated the backscattered signal, and the origin of the laser pulse. It is then possible to know the position (from the measured time) and the value (from the amplitude) of the local temperatures along the fibre.

This technique is known, for example, from the article of H. Kent, G. Bucea with the title "Distributed temperature sensing of high voltage cables—case studies from Sydney, Australia", CIGRE, Session 1992.

The distributed sensor DS is connected to a distributed sensor acquisition unit DSAU. Such unit comprises an optical transmitter, an optical receiver and a signal processing device. A pulsed light is transmitted in the fibre. The pulse repetition frequency is determined by the propagation time into the fibre. The return signal must be averaged over many pulses depending upon the power input and the required resolution in order to reduce the noise level and to compensate for attenuation in the fibre.

The signal processing system correlates each reading to the respective portion of the cable, and converts the information into digital data.

Advantageously it is preferred to operate the measurements using a dual ended measure.

In such an operating condition both ends of the optical fibre used as distributed sensor DS are connected to the distributed sensor acquisition unit DSAU and two measures are carried out in series from the two ends.

By reading the backscattered signals levels from both ends it is possible (by simple direct averaging of the reading of each point obtained in the two directions) to eliminate all non constant attenuations, as in splices or concentrated attenuation along the fibres.

Further, it allows the capability to continue to carry out measurements (at a lower precision) even after an occasional breaking of one of the optical fibre used as distributed sensor DS.

Anyway even single ended measurements can be applied when the more precise dual ended operating mode is, for some reason, not applicable.

The use of distributed sensors allows to collect measures of the cable temperature continuously along its segment, without the need to access a specific position as is the case of local sensors.

The output data of the distributed sensor acquisition unit DSAU are transferred to the programmable logic controller unit PLC. Anyway it is possible to transfer them directly to the local processing units LPU or to the remote units RU.

FIG. 2 shows only one data acquisition unit DAU, one distributed sensor acquisition unit DSAU and one local programmable logic controller unit PLC but several of such units and controllers can be used, depending on the numbers of the local sensors S1 to S6 and of the distributed sensor DS, and also for redundancy purposes.

The value of the current carried by the link is monitored through an amperometric transformer AT, which is also connected to the data acquisition unit DAU. Anyway the information about the real time value of the current into the monitored link can be made available to the system by other means or, for example directly from the energy provider.

A large variety of output devices, called control actuators A1 to A3, can be implemented into the system. These control actuators A1 to A3 comprise switching, re-routing, voltage and current control, fans and flow valves, etc. These control actuators are driven by an electrical power line controller unit EPLC, included in the data acquisition and driver unit DAD.

In FIG. 2 the programmable logic controller unit PLC and the electrical power line controller unit EPLC are shown as to be two distinct blocks, but they may be the same unit carrying out both the functions.

The programmable logic controller unit PLC and the electrical power line controller unit EPLC are connected to a local area network LAN.

A local processing unit LPU is also connected to the local area network LAN, for local elaboration. A personal computer has been used, but any kind of computer can be used.

The operating system preferably operates in a client/server mode enabling multitasking operations.

It is of course possible to use directly the local processing unit LPU to generate control input and output signals so that the programmable logic controller unit PLC and electrical power line controller unit EPLC can be internal interfaces of the local processing unit LPU.

Preferably a backup local processing unit BLPU can be conveniently connected to the local area network LAN for redundancy purposes.

Any kind of general purpose units useful for the system may be connected to the local area network LAN, like, for example, output devices OD such as printers or plotters and mass data storage devices MSD. They are generally driven by the local processing unit LPU.

All the elements connected to the local area network LAN operate in a client/server environment, to be able to share and transmit all data from the connected units. Remote units RU1 to RU4 are connected to the system by a wide area network WAN.

The remote connection is performed through a dial-up DL or a leased line LL. Radio links, optical line links not shown in FIG. 2 can be used too. In particular, connection is accepted both from fixed and mobile remote units RU1 to RU4.

In particular, 3 layers of data processing have been basically considered in the system.

Of course the representation in three layers of the computing process is an example: it may be reduced or divided into a different number of levels accordingly to system needs, complexity and/or users requests.

In the first layer, the programmable logic controller unit PLC receives data from the data acquisition unit DAU and the distributed sensor acquisition unit DSAU.

It checks the validity of the received data, for example by comparing the received data with a possible range of admissible values, and, therefore, it may recognize a possible sensor malfunctioning.

Further activities comprise the identification of some critical data of each segment according to appropriate rules, that will be explained later.

The programmable logic controller unit PLC transfers its data to the local processing unit LPU.

In the same layer of the programmable logic controller unit PLC there is the electrical power line controller unit EPLC which receives control data in digital form from the local processing unit LPU and converts that digital data in control signals for the control actuators A1 to A3.

In the second layer, the local processing unit LPU receives data from the programmable logic controller unit PLC, transmits data to the electrical power line controller unit EPLC, communicates with the output devices OD and mass data storage devices MSD, connected in the local area network LAN and communicates with the remote user RU1 to RU4.

The local processing unit LPU processes the received data, identifies critical data of each segment and of each link, performs alarm generation and stores historical and real time data.

In the third layer, the remote units RU1 to RU4 collect data and manage a set of local processing unit LPU; they can reconfigure the complete system and perform off-line and on-line advanced system analysis.

Figure 3:
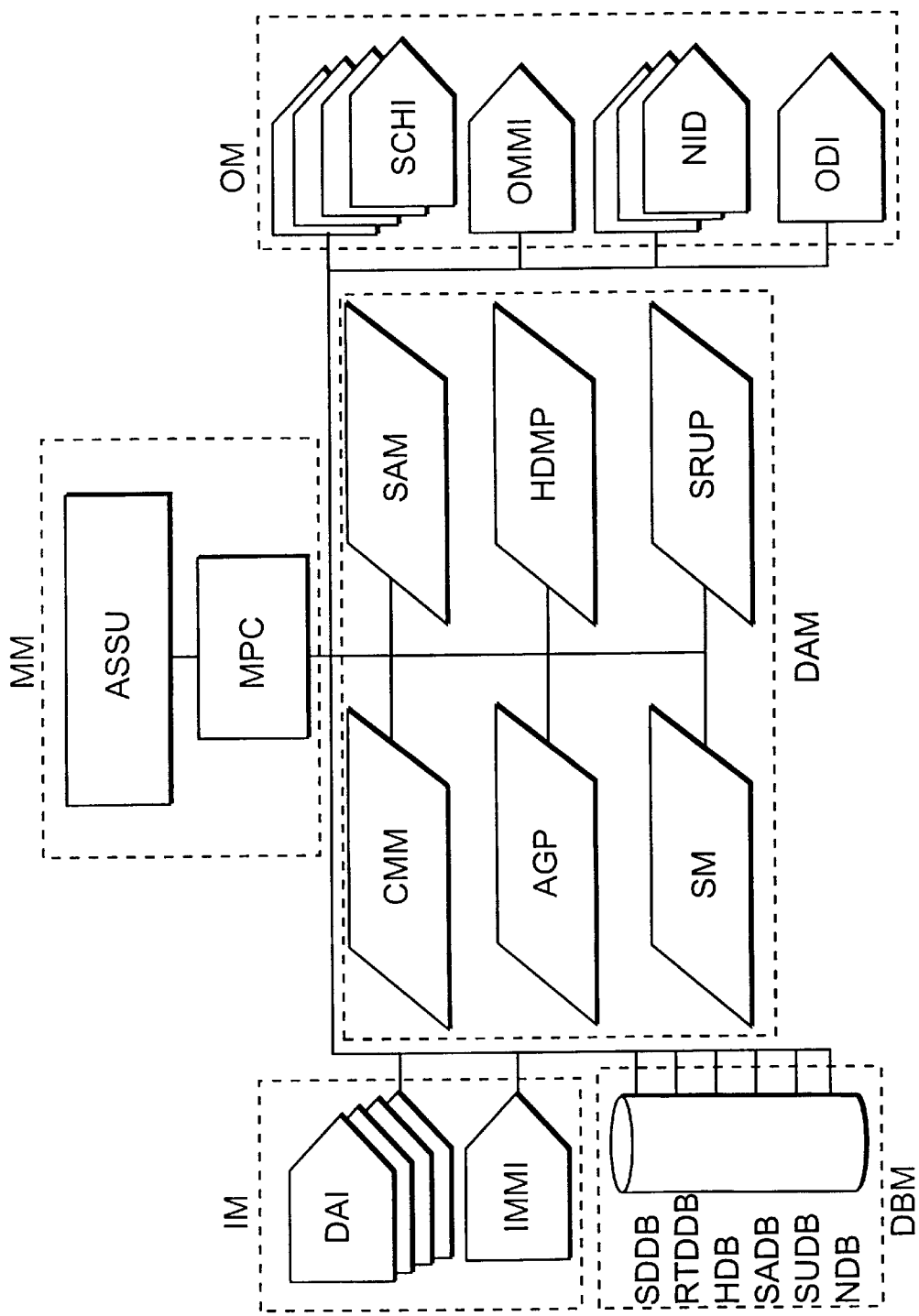
FIG. 3 is a diagram of the elaboration modules according to the present invention.

FIG. 3 shows a diagram of an example of the elaboration modules according to the present invention.

FIG. 3 applies to the example of operations performed into each local processing unit LPU that is entitled to the biggest part of computation. All general concepts are also applicable to the programmable logic controllers PLC and remote units RU, the most relevant differences will be explained later.

In this example five kind of modules are shown within the dotted lines: an input module IM, a data analysis module DAM, an output module OM, a management module MM and a data base module DBM.

The input module IM comprises the followings submodules.

A data acquisition interface driver DAI receives data from the programmable logic controller PLC, validates received data i.e. it analyses all received data by applying to said data predetermined selected rules in order to recognize out of limits values, it also checks (where applicable) for parity bits, error bits, transmission status and requests data retransmission in case of failure and converts them in a appropriate common format independent from the received data format.

A input man machine interface IMMI receives all input from the input units like switchboards, keyboards, mouse, pads etc.

Preferably the input man machine interface IMMI is a separated module that can be activated or disabled if the local processing unit LPU is unmanned, in order to reduce its workload.

The output module OM comprises the followings submodules.

A system control hardware interface SCHI transfers in the appropriate format all control data generated by the system to the electrical power line controller unit EPLC.

An output man machine interface OMMI represents all data that are necessary to properly show the status and behaviour of both the power transmission links and the system itself. The output data are presented on output devices as monitors, led panels etc. Preferably the interface generates also sounds to represent alarms warnings on relevant conditions.

A network interface driver NID translates data to be transferred through the networks, local area network LAN and wide area network WAN, using the different selected networks protocols, and manages all units network hardware.

An output devices interface ODI interface all output devices as printers, data cartridges, tape units and so on.

The management module MM comprises the followings submodules.

The first is an automatic system start-up and safekeeping procedures submodule ASSU that performs autonomous system activation or recovery in case of power failure or similar occurrences. To do so it uses the latest system configuration and uses it for the start up operations.

When no historical data of the link are available at the system start-up, this module is also responsible for the generation of all data to be utilized for the power link behaviour evaluation. To operate safely until a sufficient amount of data are available predetermined safety values are used instead, for example at start-up expected values of the link design can be used.

The complete set of operations of all the elaboration submodules, is organised by the second submodule: the system scheduler and controller called module procedure controller MPC.

It activates the evaluation method in a separate set of operation to run on-board and to be utilized for the power link status and behaviour analysis. In particular for each one of the power transmission links to be monitored by an LPU this submodule creates a process, that uses both the relevant field data from that link and/or the link stored description, the new process operates in parallel with all the other.

The module procedure controller MPC is then also entitled to the activation and deactivation of all submodules and of all processes it has generated.

The data analysis module DAM comprise the followings submodules.

A statistical analysis module SAM performs, on request or during normal operating cycle, all statistical analysis on the system data. As an example, the statistical analysis module SAM, based on the insulation temperatures, previously recorded, it predicts the percentage of ageing or life span "consumed", at the present time, by the link elements; i.e. starting from a design life span of the power transmission links elements the submodule evaluates, case by case, the life span percentage left to the various elements, driving the maintenance process before failure and in a preemptive way to increase system availability. The method applied will be explained later.

Alarm generation procedures module AGP compares selected data to be properly monitored with thresholds and/or unacceptable values and recognizes malfunctioning and failure flags. According to predefined rules it generates and distributes all over the system all generated alarms.

A historical data management procedures module HDMP manages all kind of historical data storing: in particular, it recognizes in real-time, among the data the user has selected for storing, which data are to be stored, at actual time, according to predefined sampling rules selected for each single data trend. As an example, fast changing data may be stored at a high sampling rate such as every minute, and slow changing data will be sampled at a low sampling rate, such as every hour.

A system malfunctioning and failure watchdog submodule SM is present. That submodule continuously controls the system status and operating behaviour to recognise failing units, unacceptable behaviour and that generates reconfiguration requests, e.g. if a unit of the system is failed it sets the system to use backup units. For what concerns the various units their behaviour and status can be checked, preferably, both performing analysis on their status registers, or requesting them to perform operations and then check if they are responding as expected to those requests.

For what concerns the submodules their activity can be checked, for example, by periodically applying them to a predetermined set of input data to cross-check outputs with previous ones.

Any recognized malfunction generates alarms and possibly switching between parallel back-up units or submodules to eliminate the malfunctioning unit or to bring it back to an acceptable behaviour.

The reconfiguration requests generated by the system malfunctioning and failure watchdog module SM, drive a system reconfiguration and upgrading procedure SRUP.

It controls the configuration of the system, that is it controls the available units, submodules and networks in the system and applies predetermined rules, described and registered on board, to reconfigure both the units, the submodules and the networks. This is performed both by activating backups (for units and network elements) or resetting the failed units and submodules.

The system reconfiguration and upgrading procedure SRUP submodule is also entitled to store on board all information about the relevant operating condition of the system after the reconfiguration, those information will then be available in future to the start-up and safekeeping procedures module ASSU, to be used as a start-up configuration in case of general failure.

A cable models module CMM where data analysis calculations am performed, will be explained later.

The data base module DBM comprise the followings data bases. The laying condition data of the cables and the configuration data of the system are stored into a system description data base SDDB, to be used, updated and shown to users whenever requested.

The system description data base SDDB is designed to store multiple power transmission links descriptions and to be fully upgradable in real time by means of the system reconfiguration and upgrading procedures module SRUP within the normal operations of the local processing unit LPU, i.e. without the need to interrupt the operating cycle of the system.

All real time data, after validation, are continuously stored on board and refreshed into a real time data database RTDDB; said database can be accessed by all submodules and users both to read data shared in common or to write data to modify the real time data database RTDDB (because of a new data acquisition, evaluated data or a new event).

Access and operations are generally limited by different levels in order to prevent unauthorised users to tamper with the process data; this is performed using standard operating system capabilities and routines that have been also embedded into the system. The users' permissions and access levels are stored and maintained into a dedicated system users database SUDB.

Among all real-time data (like field sensors readings, calculations results, user actions, alarms and user's responses to alarms) the ones relevant for historical analysis are continuously stored on-board into a dedicated historical database HDB; this data base is managed by the historical data management procedures module HDMP.

The historical data base workload is organized by means of a preliminary configuration where the selected data to be stored into the historical files are listed and where the storing rules (like sampling rate etc.) are fully described for all selected variables.

In particular, for each variable to be stored, apart from the general description and origin of the variable i.e. the unit or submodule in the system that originates it, it is defined the sampling rate, the variation range in order to optimize both the representation in the historical archives and the amount of stored data. The storing on board of historical data is used in the processing to take into account the thermal transients of the power transmission link elements. At the start up of the system there are no available historical data and the system start-up and safekeeping procedures module ASSU assumes the control, until a sufficient amount of data are available.

The storing of historical data can be interrupted and activated separately, for each one of the selected historical data, accordingly to the user's and system needs. The memory and mass storage filling of the historical database HDB is monitored by historical data management procedures module HDMP: pre-emptive warnings and alarms are issued whenever a historical database HDB dumping is requested in order to save older values on external device; anyway the system is capable of storing long period data and if no intervention is performed older values are overwritten.

As stated, the system is capable of autonomous generation of alarms, by means of alarm generation procedures module AGP, to be issued to the users. All alarms are stored on board into a system alarm database SADB in parallel with the users responses to alarms.

The system alarm data base is based on a configuration file where all alarms are listed and fully described: each alarm has its own unique description, a level of importance, an origin unit/submodule and several status flags. Those flags can be, as an example: the present status—indicating if the alarm situation is still valid-, the acknowledgement by users i.e. the fact that at least one user (possibly entitled to do so for very important alarms) has reacted somehow to it through the input man machine interface IMMI.

All acknowledging actions are registered on board as well as the name of the user performing it, this is done both for later control of the user's actions performed on the system and for off line analysis of system malfunctioning and defects.

Preferably another set of flags for each alarm indicates the possibility to automatically print the selected alarm, to generate sounds, to activate procedures, to present graphical advice to the user or new set of data to better gain insight on the system status.

Another on-board database, used to maintain and manage local and remote network activities is the network database NDB. This database stores all information about both the local area network LAN and the wide area network WAN and is in general used for automatic connection of all units in the networks.

For what concerns the cable models module CMM mentioned above, it is one of the most important submodules of the again mentioned data analysis module DAM. It is noteworthy to remind that the module performs some of the most advanced analysis on the system data.

The cable models module CMM reads input data from the real time data database RTDDB and the system description data base SDDB. Such data are written, for example on the real time data database RTDDB, by the programmable logic controller unit PLC, at predetermined time frequency, for example every minute, or as soon as they are available from the distributed sensor acquisition unit DSAU and from the data acquisition unit DAU. This means that there is a continuous update of this data base. The data in the system description data base SDDB can instead be changed either by users or by some reconfiguration operation.

The cable models module CMM describes each segment with a well known lumped constants thermal circuit where the cable and accessory elements are represented as a network of thermal resistance in series and thermal capacities in parallel. The heat that causes the heating of the cable is represented into the model by power generators.

For each selected segment of the link, in accordance with respective behaviour, due to different configuration lay, the system utilises a different model that is used to perform all the necessary evaluations about the actual thermal status of the power link and about the prediction of the further behaviour according to its thermal transients.

By means of these acquired data, the operating conditions of the segment are evaluated by the model.

The evaluation of the cable models module CMM can be considered as separated in two processes: the first evaluates the hot points into the cable (and of the accessories as well) and the second evaluates the environment behaviour.

The evaluation of the cable temperature, and in particular of the cable conductor temperature that is, frequently, the hot point of the cable, in thermal transient conditions can be evaluated since it basically depends on the thermal and geometrical characteristics of the cable itself. Said characteristics are known a priori or can easily be obtained from the installation parameters. Moreover those characteristics are stable in time and can therefore be considered as depending only on the local temperature according to well known dependencies. Therefore conductor temperature can in itself be precisely evaluated when there is a complete set of data describing both the cable and its past history, i.e. the current flowing into the cable since its activation or since a stationary temperature regime has been established.

For what concerns the thermal behaviour of the outside ambient things are not as straightforward: the outside ambient has not, in general, a behaviour fully known a priori and can moreover be variable sometime in unexpected ways. In addition to seasonal changes, changes due to human activity should be taken into account: hotspots caused by independent heating of the section (such as, for instance the heating due to the subsequent laying of steam or gas pipes near the energy link elements in town crowded underground), insertion of ferromagnetic elements like poles, tubes or boxes that increase locally the heat generation by varying the magnetic behaviour around the cable. All those unexpected environmental changes cannot be predicted and are monitored separately.

Another fundamental difference between the transient in the part of the section "inside" or "outside" the cable is the time constant of the phenomenon: for example the transients inside the cable are of the order of few hours, while the transients outside the cable, such as in that case of a cable laid in backfill, have a time constant of the order of days or week. In addition, environmental changes such as these due to moisture migration may take place in some weeks. The typical energy user request shows steps in the value of requested current changing about every two or three hours. That means that during that time is important to take into account the thermal transients of the of the section "inside" or "outside" the cable, in order to predict the evolution of the temperature of the cable.

The evaluation of the outside resistance is based again on a lumped constant method, modified in that the constants are continuously controlled to perform an adaptive calculation. Since the effect of current—and heat generation—can be fully appreciated by knowing the time history of both temperatures and current any further variation is in fact due to a variation on the thermal diffusivity of the outside ambient; i.e. the capability of the ambient to dissipate heat. It is therefore convenient to evaluate the thermal resistivity and diffusivity of outside environment in order to predict the cable behaviour.

The calculated thermal resistivities correlated to the actual heat flow and to the known characteristics of soils allow to predict the possible drying out of underground sections.

In case of cables in air the knowledge of outside resistivity—due to a variation in the air flow regime influences the capability of the environment to cool the link elements and the variation therefore influences the admissible current loads.

The evaluation of the cable models module CMM are the following.

In the case where no direct conductor temperature are measured, the lumped constants thermal circuit model evaluates the conductors temperature starting from the temperature value generates by the thermal sensor placed in the proximity of the cable. It is convenient to know the precise position and origin of the sensor in order to allow the model to correctly consider the material characteristics between the sensor and the cable conductor. This has particular relevance when the sensors are placed outside of the cable.

The calculation is based on both the present value of temperatures and the current carried by the cable and on the historical data; in particular all past transients occurred over the considered segment are taken into account. The use of a set of data describing the complete past history behaviour of the segment allows to reach a high degree of precision and knowledge on its actual behaviour.

The thermal resistivity of the environment, and a possible soil drying out condition is calculated for buried segments. This is performed, as described before, by using historical values of power loads and temperature. Soil dry out is then foreseen by the system that autonomously generates warnings and alarms to the users in order to avoid thermal instability condition (thermal run-out conditions).

The maximum current loads that, in defined time intervals, lead to the maximum conductor acceptable temperature are evaluated.

The current overloads that, in defined time intervals, lead to the maximum overload conductor temperature are evaluated.

The time to reach the maximum acceptable conductor temperature by assuming the actual load conditions is evaluated.

The ageing of each part of the link is evaluated based on the actual measured or evaluated temperature of the various cable elements. Said temperature values are fed to a statistical analysis module SAM. The effects of the measured temperature values on the ageing of the portions of the link are evaluated by the statistical analysis module SAM on the basis of an appropriate model, such as the Arhenius law. Since ageing can be measured at different temperatures for the materials currently utilized in cables and accessories it is therefore possible to evaluate the rate of ageing for each element by its evaluated or measured temperature during operation. Moreover the residual life span depends statistically on the electrical gradient into the cable insulation material; this can be taken into account by applying, for example, a Weibull statistical analysis for each cable to be monitored. It is then possible to evaluate the survival probability of the cable and accessories elements and to compute its residual lifespan.

All the above analyses are performed in series for each segment in which the link has been divided and described into the system description data base SDDB.

The cable models module CMM further computes, for the whole link, the overall general status: for example the maximum temperature of the link (that can in some cases be considered as the current limiting factor for the link) will be equal to the maximum among the maximum temperatures of each segment of the link and so on for each selected characteristic of the link.

The evaluation of cable behaviours into the link are conveniently divided in parallel processes in order to reduce the total evaluation time.

Each parallel process takes care of the series of link segments stored in the relevant system description data base SDDB records.

It is possible to stop processes on idle cables to concentrate all efforts on the operating ones. The activation of new cables monitoring is possible as well since they will use simply a new parallel computing task that does not interfere with the previous one. It is not necessary to stop the system when new links are added to the monitored ones.

The cable models module CMM further identifies the point of the segment were discrepancies or anomalous data from expected behaviour occur.

As an example such discrepancies can be related to temperatures that are outside a suitable temperature confidence interval, or temperatures that highly deviate from expected values, or higher temperature in said segment.

These discrepancies indicate that the segment should not be represented by a single common behaviour. The segment can then splitted, during normal operation, in two or more subsegments, until a satisfactory representation is reached. The length of a subsegment, for example, will be as long as to include all the points where such anomalous data are detected.

As an example, if concentrated losses arise on a point of the segment, due to the appearance of a ferromagnetic object newly buried near the cable or due to any element placed in the proximity of the cable able to modify the thermal behaviour of the cable, discrepancies or anomalous data with respect to the expected behaviour of said point will be recognised by the system, and a warning for the user will be generated. In consequence one or more new segments are defined by introducing relevant new thermal parameters, so that a more precise analysis is performed.

In such a way the system can be easily adapted to the changed operating conditions, unexpected events and installation retrofits, either manually or automatically. It is then possible to locate exactly, for example depending on the distribution of sensors, the site in the segment or segment where such discrepancies are found and collected.

EXAMPLE 1

In order to test a typical installation and as a part of the system design a full scale prototype has been developed and operated.

As power transmission link a closed loop of two parallel energy cables with 1600 mm$^2$ aluminium conductor, XLPE insulated has been used. The full length of the loop was about of 250 m, laid with axial separation of 0.3 m between the two parallel cables of the loop.

The monitored part of the cable has been subdivided in four segments depending on the laying conditions: cables in underground ducts, cables in cement mortar and cables in selected and unselected backfills.

The latter two conditions have been chosen in order to show the capability of the system to foresee soil dry-out: a well selected backfill, i.e. a soil having the appropriate granulometry is able to keep moisture better that an unselected one. Soil moisture migration is basically driven by thermal gradients (due to heating by cables) and capillary forces between the soil grains. Soil moisture greatly affects cable heath exchange.

The current in the cables loop has been generated by means of 12 heating transformers (produced by Special-Trasfo Via A. Doria 8, Cologno Monzese, Milano, model TRL26) each one capable of 26.5 kVA, in which the secondary coil was constituted by the closed cables loop. Each transformer has been put in parallel with its own set of condensers (produced by ICAR Corso Magenta 85, Milano, model SuperRiphaso with a nominal power of 20 kVAR, reaching a capacity of 400 $\mu$F each) to re-phase the current and reduce the current needed to energise the loop. The current in the loop has been controlled by varying the transformers feeding tension by means of a tension variator (type V40 from the already cited SpecialTrasfo) with a nominal power of 40 kVAR.

In the prototype, both distributed temperature sensors and thermocouples have been used. Some of the temperature sensors, including the distributed sensors, have been used for the system operation and other temperature sensors have been used to check predetermined points in order to compare the evaluated temperature in that points, with the real temperature in these points. Thermocouples were of copper/constantan type. They were twisted and a double screen has been added in order to reduce the possible electromagnetic noise interference.

The distributed temperature sensor DSAU was a DTS 800-MR produced by York Sensor Limited, York House, School Lane, Chandler's Ford, Hampshire, UK. It is able to measure temperature up to a distance of 12 Km over two fibre loops, with a spatial resolution of 1 m.

A double ended measure has been implemented with autonomous switch-over to a dual single ended measure to continue normal operations after a possible single fibre break. Two loops of fibre have been used: the first one was located on the external layers of the cable servings and the second one at a constant distance outside the cable surface, to verify the model application with a dual sensor configuration.

The current in the loop was monitored by an amperometric transformer AT; the model AOS from Tecnotrasformatori Sri, Via Lambro 26, Opera, Milano, with a ratio of 3000/5 was used.

The data acquisition, comprising the programmable logic controller unit PLC and the electrical power line controller unit EPLC, have been jointed together in a multiple card rack model T-Rack from Orsi Automazione Spa Corso Europa 799, Genova, with 4 analogue input cards, 1 analogue output card and 2 digital input cards; the total number of I/O channels was 144.

As programmable logic controller unit PLC dual Series 8 from the already cited Orsi Automazione have been selected.

As local processing unit LPU a desktop computer based on a Pentium processor have been selected.

The present operating system is Windows NT.

In the prototype installation an ArcNet LAN is used, with an active hub to let the system operate with multiple units. It is produced by SMC, 20 quarter, rue Schnapper, St. German en Laye, Francia, type HUB03-240.

In the experimental set up a leased line using V35 standard has been used to connect the local processing unit LPU with the remote units RU1–RU4, a spare dial-up line with fast modem was implemented for mobile connection from a mobile control station (a portable Pentium laptop with fast modem card) to let remote control of the overall system and to validate the operating procedures in this configuration.

In the prototype installation the conductor temperatures in the various sections were predicted with an error of less than ±1° C. with reference to the ones directly measured inside the cable insulation.

The maximum acceptable length of a temperature sensor formed by thermocouples is in the order of some hundreds of meters, when proper shielding and protection are implemented; when signals are locally digitised, they can be transmitted for few kilometers.

For the optical distributed temperature sensors, currently several versions are available, up to lengths of 140 km.

The local area network LAN is in general not wider than few hundred meters up to some km when using optical fibre networks.

Figure 4:
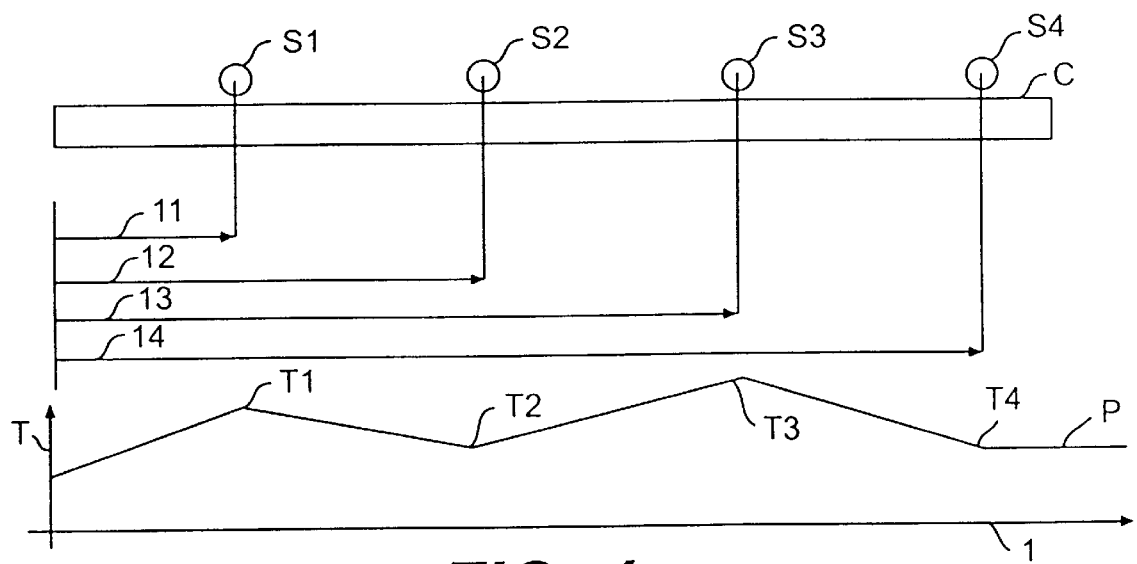
FIG. 4 is a schematic representation of a cable with its sensors and its temperature profile.
Figure 5:
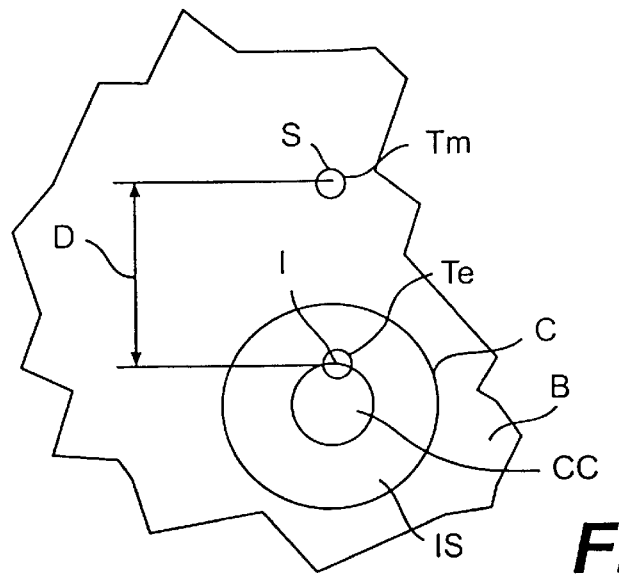
FIG. 5 is a schematic representation of a cable section laid in an environment associated with a thermal sensor.
Figure 6:
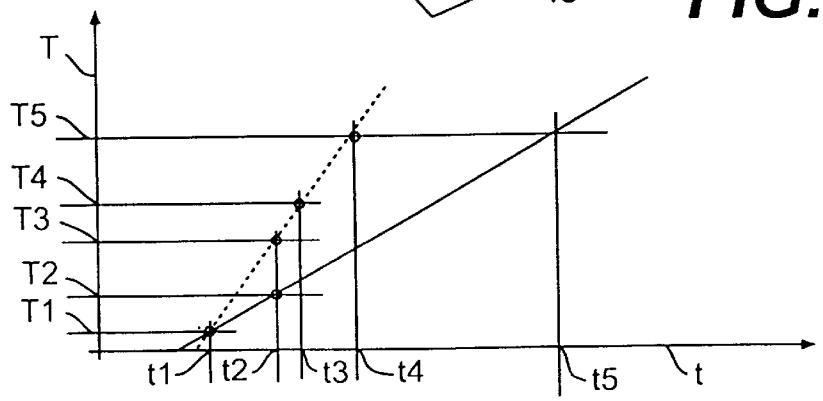
FIG. 6 is a chart showing a representation of a behaviour of a particular part of a segment of a cable.

An example of the operation carried out by the present invention is described in FIGS. 4 to 6.

In particular, FIG. 4 shows, for example, a segment of a power transmission link, consisting in a cable C, with the associated temperature sensors S1 to S4, which provide the relevant temperature values T1 to T4 reported in a thermal profile P. In the case of local sensor the respective location I1 to I4 is known by design. In the case the temperature is detected by the optical time domain reflectometry OTDR (i.e. distributed sensor) the complete thermal profile P along the cable segment is known with the resolution of the used instrument.

In the simplest operation of the system the operating condition of the segment is determined by the highest measured temperature in the segment (T3 in the example), which is compared with a critical temperature value Tc. In case T3 exceeds Tc an alarm and/or a control signal for causing a regulation action in the link will be generated.

Tc is selected in order to provide a safety margin with respect to the cable failure; typically, the width of the safety margin depends on the closeness of the sensor to the critical area within the cable.

By way of an example, with sensors located on or close to the outer surface of the cable and in absence of any significant further operation on the measured temperature values, a convenient value of Tc typically does not exceed about 50÷60% of the maximum temperature which can be accepted for the cable insulation (which is generally 70°–90° C.), in order to take into account the whole temperature profile across the insulation.

In case the thermal sensor S is placed in the proximity of the cable C, for example in a backfill B, at the distance d from a critical position I inside the cable C, that is in a position I between the cable insulation IS and the conductor CC, as shown in FIG. 5, the temperature Te, i.e. the real operating condition of the cable, is calculated on the basis of the measured temperature Tm, according to a predetermined model, by taking into account further values provided by other sensors, such as the current carried in the cable, environment thermal resistivity, soil moisture, forced cooling parameters, etc. as provided by corresponding sensors and by predetermined design values.

Further it is advantageous to take into account in this calculation both the thermal resistivity and the thermal transients occurring over the segment, in order to take into account the time variable heat flow into the cross section of the cable and around the cable itself.

To evaluate the effect of the variable heat flow into the cross-sections the operating conditions of the cable and its surroundings are recorded during operations at predetermined intervals; for example, the temperature values are recorded every minute and the slowly changing parameters, such as soil moisture, are recorded every hour.

Such thermal transients correspond to the phenomenon by which the varying temperature rising across the cable layers reaches an asymptotic value. By way of example, the time associated to said transients within the cable insulation can be from 4 to 8 hours and longer, depending on the cable size. Instead the thermal transients in the external environment of the cable, specifically in buried ones, can be longer than several days. Accordingly, the temperature of the reference point I, and its evolution in time, is evaluated by considering both the parameters measured in the instant time, and the corresponding stored parameters relevant to a predetermined period of time, preferably several days before or possibly the complete operative life of the cable.

By using the method of the invention, i.e. by evaluating the temperature in the critical position I of the cable, the time dependence of the considered values is fully appreciated.

The comparison can be made with reference to the critical temperature Tc of point I, which can conveniently be more close to the maximum temperature which can be supported by the cable.

In addition from the knowledge of the temperature at a given time and the knowledge of a new request of current by the user, the model predicts the temperature at a later time. Accordingly the corresponding action, when required, can be caused well in advance with respect to the moment in which the cable exceed the critical temperature T'c.

This is utilized for predict the thermal behaviour of the cable segment for different loads and times and to cause timely responses to prevent overloads.

In particular the maximum current loads that, in defined time intervals, lead to the maximum conductor acceptable temperature and the maximum conductor acceptable overtemperature are evaluated.

It is also evaluated the time to reach the maximum acceptable conductor temperature and the maximum conductor acceptable temperature by assuming the actual load conditions.

In this way, by predicting the cable link temperature it is possible to anticipate control actions in order not to overload or overheat the cable.

Based on the temperature of the several parts of the cable, the ageing of each part of the link is statistically evaluated.

Based on the calculation carded out on each segment, the overall general status for the whole monitored link is evaluated.

In addition the points of the segment were discrepancies or anomalous values from expected behaviour occur are identified, based on the previous calculations.

For example, considering a particular point of the cable and with reference to FIG. 6, at the time t1 the temperature is T1. Based on the model, at the time t2 the expected temperature should be T2, and at time t5 the expected temperature should be T5, that could represent the maximum temperature admissible of the cable, expected at the time t5. If the measured temperature at time t2 is T3 and it is far from the expected value T2, for example it is outside a predefined confidence level, this could mean that an anomalous behaviour of the cable or of its surrounding arises in that point, for any kind of the already cited causes.

In this case the cable behaviour is not anymore the expected one. According to the invention the part of the segment having the anomalous behaviour, is isolated, by dividing the segment in at least two subsegments, in order to take into account the new behaviour. The length of the new subsegment could be as the portion of the segment which comprises the anomalous measures.

For the new subsegment a new model, or a new set of parameters, is used in order to predict the proper temperature T4 at the time t3, and therefore predict the proper maximum temperature admissible of the cable T5, expected in this case at the time t4, that is earlier than before, enabling an early alarm or regulation.

The cable models module CMM evaluates, in this way, the critical operating conditions related to the segment and to the link identifying critical link data.

The critical data are the information related to the status and behaviour of the segments on the link.

They could be, as already said, for example, the maximum temperature, or other critical parameters, of the segment and of the link, or the discrepancies or anomalous data from expected behaviour.

The detailed operation used for evaluations are not described here because with the information here reported, they are within the capability of the skilled person in the art.

What is claimed is:

1. Method for transporting electric power in a current conducting link comprising:

supplying an electric current of predetermined value in the link;

dividing said link into a predetermined number of segments;

associating a first predetermined prediction model to each of said segments;

laying a plurality of temperature sensors along the link, at least two of said sensors being operatively associated with each of said segments and being affected by said current value;

getting respective sensor values from said sensors at a first time;

determining an expected operating condition in one of said segments at a second time as a function of said sensor values at said first time and of said electric current value, according to said first prediction model associated with said segment;

determining an actual operating condition in said segment at said second time associated to sensor values generated at said second time;

comparing said actual operating condition with said expected operating condition;

associating, or having associated, a second predetermined prediction model with said segment or a subsegment thereof in presence of a difference between said actual operating condition and said expected operating condition exceeding a predetermined value.

2. Method according to claim 1, wherein said phase of associating, or having associated, a second predetermined prediction model comprises the phase of dividing, or having divided, said segment into at least two subsegments, each subsegment being associated with at least one sensor, in presence of a difference between said actual operating condition and said expected operating condition exceeding a predetermined value.

3. Method according to claim 1, further comprising the step of regulating said electric current value so as to maintain an expected operating condition of the segment at a selected time within a predetermined value.

4. Method according to claim 3, wherein the step of regulating the electric current value includes re-routing the current within the link to reduce the current rate in a segment in the link.

5. Method according to claim 1, wherein the step of determining an expected operating condition includes:

recording a number of sensor values measured at respective times earlier than a given time;

evaluating the expected operating condition of the segment at said second time according to said first model as a function of said sensor values at said first time, of said electric current value and of said recorded sensor values.

6. Method according to claim 1, wherein said link includes an insulated electric cable of predetermined length, said insulated electric cable including at least one segment.

7. Method according to claim 6, wherein said operating condition of the segment associated to said sensor values includes the temperature in a point inside the cable insulation in a selected longitudinal location along the cable.

8. Method according to claim 6, wherein said sensor values include a longitudinal profile of the temperature along the segment, measured at a predetermined radial distance from the cable conductor.

9. Method according to claim 8, wherein said longitudinal profile of the temperature along the segment is measured at cable surface.

10. Method according to claim 1, wherein said operating condition of the segment associated to said sensor values includes the temperature in a predetermined location in the segment.

11. Method according to claim 1, wherein said sensor values at the first time and said sensor values at the second time include a longitudinal thermal profile along the segment, measured with a predetermined longitudinal resolution.

12. Method according to claim 11, wherein said profile of the temperature includes an optical time domain reflectometry (OTDR) trace obtained through an optical fibre operatively associated with said segment.

13. Method according to claim 11, wherein said subsegment associated to said second prediction model is longitudinally extended for a length including at least the portion of said profile where the expected temperature determined from said first sensor values and said first prediction model is different from the actual temperature determined from said second sensor values and said first prediction model.

14. Method according to claim 1, wherein each of said segments has an expected substantially uniform thermal behaviour.

15. Method according to claim 1, wherein the step of determining the actual operating condition is repeated at a predetermined time frequency.

16. Method according to claim 1, wherein the step of determining the operation condition of the segment includes determining the temperature in a predetermined number of locations in the segment and choosing the highest of said determined temperatures as the operation condition of the segment.

17. Method according to claim 1, wherein the step of determining the actual operating condition of the segment associated to said sensor values includes:
  getting a number of sensor values at a time;
  determining a number of status parameters associated to said sensor values;
  selecting a critical value among said status parameters;
  evaluating the operating condition of the segment as a function of said critical value.

18. Method according to claim 1, wherein the step of further comprises operating a thermal control means associated with said segment to maintain the operating condition in said segment within a predetermined value.

19. Method according to claim 1, wherein the steps of determining both the expected and actual operating conditions of the segment associated to said sensor values of both the first and second times comprises the step of locating a place along said segment where said sensor values of both the first and second times are measured.

20. Method according to claim 1, further comprising the step of getting further sensor values relating to the thermal exchange capability of the segment.

21. System for transporting electric power comprising:
  a link including at least an electrical cable;
  a generator supplying electrical power into said link;
  a plurality of sensors operatively associated with said link, said sensors forming a longitudinally distributed temperature sensor;
  a data acquisition unit connected to said sensors;
  a data processing unit operatively associated with said data acquisition unit;
  a control actuator operatively associated with said data processing unit, said control actuator being such as to generate a control signal responsive to data generated by said sensors as processed by said data processing unit, wherein said control signal is a regulation signal acting on said generator.

22. The system according to claim 21 wherein said optical fibre is located in proximity to said electrical cable.

23. The system according to claim 21 wherein said optical fibre is located inside said electrical cable.

24. The system according to claim 21, wherein said longitudinally distributed temperature sensor includes an optical fiber.

25. The system according to claim 24, further comprising an optical time domain reflectometry apparatus connected to said optical fiber that determines a temperature profile of said electrical cable using a pulsed light transmitted in said optical fiber.

26. The system according to claim 21, where said plurality of sensors comprises a plurality of thermocouples.

27. System for transporting electric power comprising:
  a link including at least an electrical cable;
  a generator supplying electrical power into said link;
  a plurality of sensors operatively associated with said link, said sensors forming a longitudinally distributed temperature sensor;
  a data acquisition unit connected to said sensors;
  a data processing unit operatively associated with said data acquisition unit a control actuator operatively associated with said data processing unit, said control actuator being such as to generate a control signal responsive to data generated by said sensors as processed by said data processing unit, wherein said control signal is a regulation signal acting on thermal control means to associate to a portion of said link.

* * * * *

UNITED STATES PATENT AND TRADEMARK OFFICE
CERTIFICATE OF CORRECTION

PATENT NO. : 6,167,525 B1
DATED : December 26, 2001
INVENTOR(S) : Donazzi et al.

It is certified that error appears in the above-identified patent and that said Letters Patent is hereby corrected as shown below:

<u>Column 21, claim 18,</u>
Lines 25 and 26, "wherein the step of further comprises" should read -- further comprises the step of --.

<u>Column 22, claim 27,</u>
Line 35, after "acquisition unit", insert a semicolon and insert a line break immediately thereafter.

Signed and Sealed this

Ninth Day of April, 2002

Attest:

JAMES E. ROGAN
Attesting Officer          Director of the United States Patent and Trademark Office